2 Sheets—Sheet 1.

L. J. BAKER.
Rotary-Engine.

No. 223,978. Patented Feb. 3, 1880.

Witnesses.

Inventor.
Loring J. Baker.

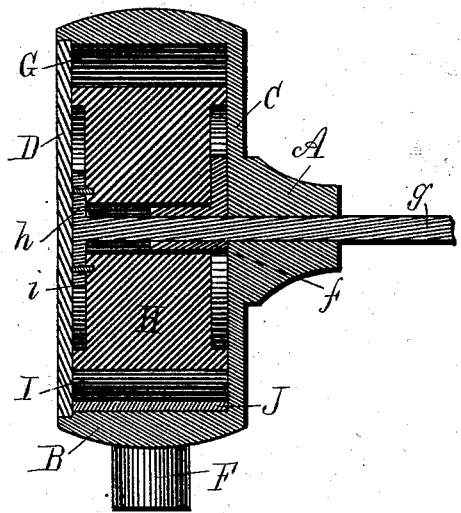

UNITED STATES PATENT OFFICE.

LORING J. BAKER, OF BOSTON, MASSACHUSETTS.

ROTARY ENGINE.

SPECIFICATION forming part of Letters Patent No. 223,978, dated February 3, 1880.

Application filed October 6, 1879.

*To all whom it may concern:*

Be it known that I, LORING J. BAKER, of the city of Boston, county of Suffolk, and State of Massachusetts, have invented certain Improvements in Rotary Engines, of which the following is a specification.

This engine, which is adapted to any fluid-motor, is of the rotary class, and contains a circular case or wheeled chamber having closed ends and inlet and discharge ports, a cylindrical hub or wheel disposed concentrically within such case and revolving upon a fixed axis, and a series of sliding gates disposed within radial channels cut in such limb.

My present improvements consist, first, in the manner of effecting the sliding reciprocating movements of the gates, which is done by cams or inclined grades fixed one to each gate, which operate with a stud projecting from one head of the case. The stud, wiping alternately against one side of the grade, ascends the latter and descends upon the other side.

My improvements consist, secondly, in mounting the rotary hub or gate-carrier upon a rigid tubular stud extending from one head of the wheel-case, and in carrying the driving-shaft through this stud and connecting the shaft and hub by a yielding or flexible connection, in manner and for purposes hereinafter stated.

Figure 1:
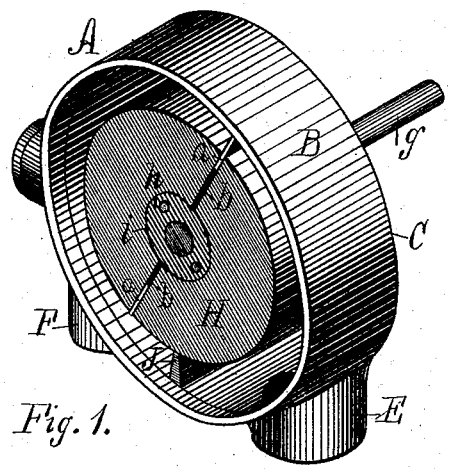
Figure 2:
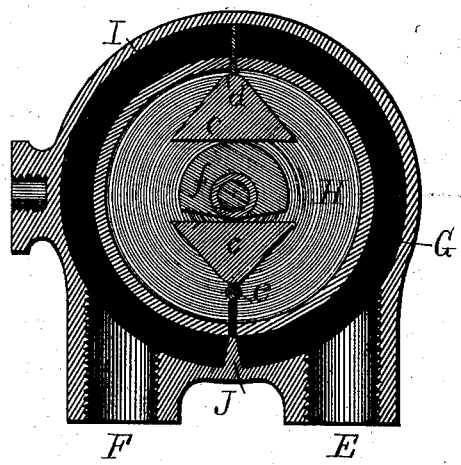

The drawings accompanying this specification represent, in Figure 1, a perspective view; Fig. 2, a horizontal cross-section, and Figs. 3 and 4 perspective views of valves of a machine embodying my improvements. Fig. 5 in said drawings represents a longitudinal section of the engine.

In such drawings, A represents a flat circular case or curb composed of a short cylinder, B, and heads C D, one of such heads—viz., D—being removable and firmly bolted to the case, while the opposite head, C, may be cast integral with the case. The case A is formed with two ports, E F, arranged in close proximity to each other, and communicating with the interior G of the case, which is the wheel-chamber; and if the gate-actuating grades are arranged to permit the wheel to rotate in either direction, then either port E or F may be the inlet or discharge port, according to which of the two the fluid-motor is directed. If the wheel turns in but one direction, one valve becomes the inlet and the other the exhaust or discharge.

Within the wheel-chamber G, I dispose concentrically a cylindrical hub or wheel, H, the length of this hub being the same as the interior of the chamber, while its diameter is considerably less, in order to provide an annular passage, I, between the two for passage of the fluid, a stop or abutment, J, being extended inward from the periphery of the chamber between the ports E and F, and closely up to the circumference of the hub, to prevent escape of fluid from the inlet to the discharge port, except by way of the passage I.

The sliding gates, as shown in the present instance, are two in number, and each consists of a thin flat rectangular plate, $a$, let into and sliding within a channel, $b$, cut radially in the limb H, the length of each gate and its disposition with respect to the hub and wheel chamber being such that when crowded outward its outer end shall extend closely up to the inner circumference of the case, and when crowded inward its outer end shall be flush, or practically so, with the circumference of the hub.

To one end of each gate $a$, I affix a flat triangular block or plate, $c$, the apex $d$ of which is presented to the circumference of the limb, while the base of the two are parallel, each block constituting a cam or inclined grade to effect the requisite reciprocating movements of its gate, and both being operated by a stud, $e$, extending into the wheel-chamber from one of the heads of the case, (the fixed head C in the present instance.)

The pivot or axis of the wheel or hub H is a tubular stud, $f$, extending axially within the wheel-chamber from the head and through the limb H, this stud being sufficiently rigid and strong to withstand all the thrusts and labor devolving upon the wheel by the action of the driving-belt and prevent such wheel from being thrown out of its true position, as is the tendency where the driving-shaft is connected directly to it.

The driving-shaft is shown at $g$ as having at one end a head, $h$, which is let into a corresponding socket, $i$, created in one end of the hub H, while the shaft itself is carried through the tubular pivot $f$, and extends beyond the opposite head, C, a sufficient distance to permit of attachment of a pulley.

The head of the shaft is connected loosely to the hub by any suitable means, (in the present instance by pins from the head,) in order that strains or thrusts upon the shaft, such as would tend to divert the latter from the true axis of the wheel-chamber, shall have no effect to produce like disarrangement of the hub. For this reason the hub always retains its original position within the case, and no uneven wear ensues between the two, and leakage of fluid is avoided.

Figure 3:
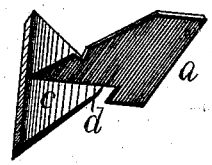

In Fig. 3 of the drawings the inclined grades $c\ c$ are represented as double-acting—that is, sloping at both ends—in order that the stud $e$ may ascend the apex of the grade from either side, in which case the hub may rotate in either direction, according to which of the ports E F is made the inlet.

Figure 4:
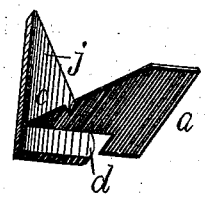

Fig. 4 of the drawings shows one of the inclined grades as having but one side—viz., $j$—sloping, while the other is right-angular, or practically so. In this case the hub can turn in but one direction, as the stud can ascend the grade from but one side; but the slope of the grade can be longer, and consequently its ascent easier, and less labor devolves upon the parts.

In the accompanying example the port E is the inlet, and F the discharge or exhaust. Fluid entering E impinges against the end of the nearest gate $a$, which is projecting from the hub and across the passage I, and thereby puts the hub in rotation, and this continues until the gate passes the exhaust F, and the spent fluid or excess of fluid escapes by such exhaust, the hub and gate continuing their movement, and the latter, as it passes the abutment J, being crowded inward by the action of the stud $e$ upon its cam-block $c$, in order to avoid the obstruction which the abutment presents in its path.

The cam grade or block is so arranged with respect to the inlet E that the gate is not fully opened and the passage I closed until the gate passes such inlet.

Each gate in succession is acted upon by the fluid under pressure, recedes from the abutment, and opens again after passing the inlet, and the rotations of the hub and driving-shaft thereby become continuous.

The gates, being closed between solid walls for nearly their entire length, are protected from injury, and offer an unyielding resistance to the fluid, as between themselves and the hub, and for this reason the entire force of the fluid is utilized.

My motor is cheap in construction, runs with little friction, and is very durable.

I claim—

1. The combination of the gates, the sloping grades, and stud $e$, operating such grades, substantially as herein described, and for purposes stated.

2. The combination of the shaft and hub, when the two are connected by a loose or yielding connection or joint, which protects the hub to a great extent from the thrusts to which the shaft is subjected, substantially as and for purposes stated.

3. The combination of the case which contains the wheel or hub, the hub, the driving-shaft, and the tubular stud or post which constitutes a pivot to the hub, and through which the shaft passes, substantially as stated.

4. In general combination, the case A, with its channels G, ports E F, abutment J, and stud $e$, the limb H, with its tubular pivot $f$, and gates $a\ a$, with their cam grades or blocks $c\ c$, and the shaft $g$, connected loosely with the hub, all essentially as and to operate as stated.

L. J. BAKER.

Witnesses:
F. CURTIS,
H. E. LODGE.